Nov. 5, 1929.　　　I. B. ANDREWS　　　1,734,609
THERMALLY CONTROLLED HEATING APPARATUS
Filed Feb. 13, 1926
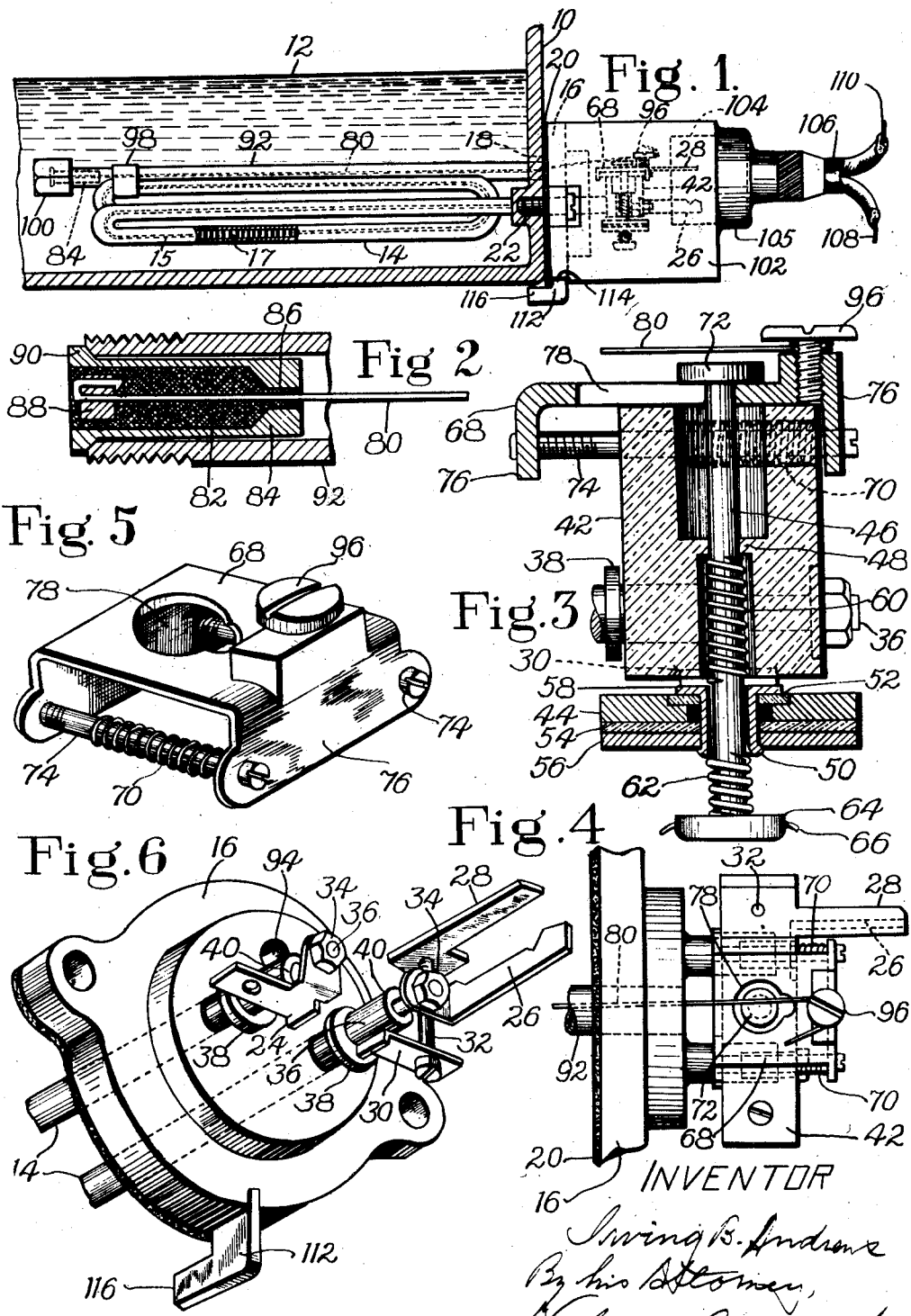
INVENTOR
Irving B. Andrews
By his Attorney,
Nelson W. Howard Patented Nov. 5, 1929

1,734,609

UNITED STATES PATENT OFFICE

IRVING B. ANDREWS, OF BEVERLY, MASSACHUSETTS, ASSIGNOR TO UNITED SHOE MACHINERY CORPORATION, OF PATERSON, NEW JERSEY, A CORPORATION OF NEW JERSEY

THERMALLY-CONTROLLED HEATING APPARATUS

Application filed February 13, 1926. Serial No. 88,054.

This invention relates to thermally controlled heating apparatus and is herein disclosed as embodied in an electrical apparatus for heating water, but the invention, in certain aspects, is not limited to the heating of water nor to using an electric current to furnish the heat.

When, for example, a heating apparatus is designed to heat a liquid in a receptacle, it is detrimental to either the receptacle or the heating device, if not actually unsafe, to permit it to function when there is no liquid or too little liquid in the recptacle to dissipate the heat developed, particularly if the device is capable of boiling the liquid when operating as intended. It sometimes happens, through inadvertence or neglect, that the user of such apparatus will fail to maintain a safe quantity of liquid in the heating receptacle while the heating device is functioning, and when this happens the heating device develops an excessive temperature and thereby causes damage of one kind or another. In the case of electric heating apparatus the most common result of such inadvertence or neglect is that the heating unit burns itself out or melts other parts of the apparatus, while in the case of a gas burner or oil burner the flame may ruin the receptacle.

In view of the problem above explained an object of the invention is to provide improved means for automatically interrupting the delivery of a heating medium to a heating device when, for example, the substance to be heated is too much depleted or when the heating device is set in operation while there is too little or no substance to dissipate the heat developed.

Acordingly, a feature of the invention consists in a novel organization comprising a receptacle for the substance to be heated, a heating device, means for conducting a current of heating medium to said device arranged to be submerged in the substance of the receptacle, means tending normally to interrupt the supply of heating medium, and controlling means including a thermally responsive element, for example, a fusible element, arranged to maintain the interrupting means initially in non-interrupting position but adapted to release the latter automatically in consequence of being heated above a certain temperature. When the heating device and the thermally responsive element are arranged in the thermal relation shown, much of the heat that would otherwise be communicated from the heating device to the thermally responsive element will be dissipated from the heating device by conduction to the substance in which it is submerged. Thus, so long as the receptacle contains sufficient substance to cover the heating device no part of the latter will become overheated, but when, for one cause or another, a portion of the heating device is uncovered, as by depletion of the substance in the receptacle, the uncovered portion will undergo a rapid increase in temperature and thereby cause the controlling means to interrupt the supply of the heating medium while the rest of the heating device is covered by the heated substance.

From the foregoing it may be understood that it would be within the scope of the invention to use such an organization to boil water or some other liquid, or to heat water or other liquid without necessarily producing ebullition, or to heat a substance that is solid at atmospheric temperatures and capable of being liquefied by heat without being boiled, for example, wax or paraffin. Furthermore, while the illustrated exemplification comprises a heating device that utilizes an electric current as the heating medium, it would be within the scope of the broadest aspect of the invention to apply thermo-responsive means in like manner to interrupt the delivery of other forms of heating media, for example, gas to a gas-burner, oil to an oil-burner, or steam to a steam-heater.

The illustrated apparatus includes a fusible cartridge of improved construction arranged to maintain an electrical circuit-breaker initially in circuit-closing position. The fusible cartridge is treated as an individual subject of invention in my co-pending application Serial No. 307,498, filed Sept. 21, 1928, as a division of this application.

Another object of the invention is to provide for supplying current to an electric heating unit through a flexible, detachable cord, and at the same time to prevent manipulating or otherwise touching the circuit-breaker or other parts of the electrical apparatus when the cord is applied to connect the device with the source of current. According to the illustrated construction a novel feature by which the latter object is attained consists in electric coupling terminals associated with the circuit-breaker and the heating unit, a detachable shell or housing adapted to enclose the circuit-breaker and said terminals, and an electric coupling affixed to said shell so that applying the coupling to the terminals requires applying the shell simultaneously to enclose the circuit-breaker.

Other features of the invention are hereinafter described and claimed and are shown by the accompanying drawings.

Referring to the drawings:

Fig. 1 is a view, partly in vertical section and partly in elevation, including a portion of a receptacle equipped with electric heating apparatus and automatic thermal-electric controlling apparatus applied thereto in accordance with this invention;

Fig. 2 is a sectional view, on an enlarged scale, of the fusible element by which the circuit-breaker is maintained initially in closed position;

Fig. 3 is a vertical section of the circuit-breaker in circuit-closing position as shown in Fig. 1;

Fig. 4 is a top plan view of the circuit-breaker showing the locking device in its position of release to effect the opening of the circuit;

Fig. 5 is a perspective view of the locking device alone; and

Fig. 6 is a perspective view of an assemblage comprising the stationary conductors by which the current is supplied to the heating unit.

The structure indicated at 10 in Fig. 1 represents a portion of a receptacle in which it may be desired, for example, to heat water. A body of water is indicated at 12. An electric heating unit of the hairpin type is indicated at 14. The visible part of this unit is a brass tube the two ends of which are brazed or otherwise tightly and permanently connected to a metallic fixture or closure 16. The tube encloses an electric resistance element 15 on which bushings 17 of refractory insulating material are strung. One upright wall of the receptacle 10 is formed with a hole 18 through which the heating unit 14 may be inserted, and a water-tight joint between the closure and the receptacle is provided by a gasket 20 of suitable material such as rubber. The closure is secured tightly against the gasket by two screws one of which is indicated at 22 in Fig. 1. The ends of the tube of the heating unit extend through the closure 16, as shown in Fig. 6, and the terminals 36, 36 of the electric resistance element enclosed in the tube are connected respectively to a stationary contact member 24 and a coupling terminal 26. Another coupling terminal 28 is electrically connected to a stationary contact member 30 by a screw 32. The conductors 24 and 26 are secured by nuts 34 to the terminals 36, 36, respectively, of the resistance element. Thus, the circuit by which the electric current is supplied to the heating unit may be traced as follows: coupling terminal 26, resistance terminal 36, resistance element 15, the other resistance terminal 36, stationary contact member 24, movable contact member hereinafter described, stationary contact member 30, screw 32, and coupling terminal 28. The terminals 26 and 28 are insulated from the tube 14 by refractory material including mica washers 38 and the bushings inside the tube.

The two coupling terminals 26, 28, and the two contact members 24, 30, are affixed to a block 42 of insulating material such as vulcanized rubber and are preferably partially embedded in said block to maintain them positively in the desired positions. Fig. 1 shows the member 26 embedded in one side and Fig. 3 shows the contact member 30 embedded in the bottom of the block. This block is formed with sockets to receive the terminals 36, the latter extending entirely through the block so that the latter may be tightened against the shoulders 40 by tightening the nuts 34 when all the parts are assembled.

A mechanically operated, self-opening switch that tends normally to break the circuit includes a contact member 44 arranged to engage both the contact members 24 and 30. This switch member 44 is a circular disk of brass and is electrically insulated from all other parts except when it touches the contact members 24 and 30. As shown by Figs. 2, 3 and 5, the parts are enlarged to about two diameters. The switch member 44 is carried by a vertically movable stem or plunger 46 which is arranged to slide in a bearing 48 in the block 42. The stem 46 extends loosely through a metallic bushing 50 by which the contact member 44 and various other parts are permanently held in assembled relation. The upper surface of the contact member 44 is rabbeted to receive a washer 52 of insulating material such as compressed fibre, said washer fitting closely the barrel portion of the bushing 50 to maintain the contact member 44 in concentric relation to the bushing and out of contact with the latter. The hole in the center of the member 44 is substantially larger than the barrel portion of the bushing to prevent contact of these members one with the other. The contact member 44 rests upon a washer 54 of insulating material such as compressed fibre and this washer rests in turn upon a metallic washer 56. When the members 52, 44, 54 and 56 have been assembled, the barrel portion of the bushing 50 is inserted through them, and its lower end is swaged, as shown, the upper end of the bushing having a flange 58 by which the assemblage is maintained intact. The loose play between the stem 46 and the bushing 50 permits the movable contact assemblage to tilt, if necessary, to enable the contact member 44 to engage the stationary contact members 24 and 30 with equal pressure. A relatively light compression spring 60 is placed on the stem 46 before the contact assemblage is placed thereon, and therafter a compression spring 62, preferably stronger than the spring 60, is slipped on the stem, and the parts are held in assembled relation by a head 64 secured to the lower end of the stem by a cotter-pin or wire 66.

To close the circuit-breaker the stem 46 is raised by placing one finger under the head 64 and raising it. Since the spring 62 is stronger than the spring 60 it will compress the latter and raise the contact member 44 into engagement with both of the stationary contacts 24 and 30. The closed position of the circuit-breaker is represented in Figs. 1 and 3. To lock the device in closed position a locking member 68 is moved to the left against the applied force of two compression springs 70, 70, a portion of the locking member being thereby placed under a head 72 at the upper end of the stem 46, as shown in Fig. 3. The locking member 68 is maintained in cooperative relation to the insulating block 42 by two screw rods 74 which extend through ears 76 formed on opposite sides of the locking member and also through the block 42. The block is formed with sockets to receive the compression springs 70. A hole 78 shaped somewhat like a buttonhole is formed in the locking member 68 to permit the head 72 to pass through it when the locking member is moved to the right by the springs 70.

The locking member 68 is controlled by a fusible element, hereinafter described, and a non-fusible connecting wire 80, both of which are extraneous to the electrical circuit and electrically insulated from the various conductors by the insulating members 17, 38, 42, 52 and 54 (Figs. 1 and 3). The preferred construction of the fusible element is illustrated by Fig. 2. A body of fusible material 82, such as solder or some similar alloy, is cast in a shell 84 of brass or other suitable non-fusible metal having a hole 86 through which the connecting wire 80 extends. One end of this wire is inserted through and clenched in a block 88 of non-fusible metal, and this block is cast in the fusible metal 82. The assemblage comprising the shell 84, fusible metal 82 and connecting wire 80, form a cartridge that may be readily and quickly applied as hereinafter described.

The shell 84 is preferably cylindric and is formed with a head or arresting flange 90 adapted to be seated against one end of a holder or container which, as shown, is a metal tube 92, while the body of the shell is adapted to be inserted into the tube. The other end of the tube 92 is brazed or otherwise permanently secured in a hole 94 (Fig. 6) formed in the closure 16 and substantially in line with an anchoring screw 96 carried by the locking member 68. The tube 92 is thus arranged to be submerged in the body of water 12 and is parallel to and preferably in contact with one of the straight portions of the tube 14 of the heating unit. Inasmuch as the tube 14 has a plurality of straight, horizontal portions at various levels, the tube 92 is preferably arranged in contact with and above the highest portion of the tube 14 to prevent too high a temperature in the heating unit when sufficient water is lacking. Thermal conductivity between the tubes 14 and 92 is preferably supplemented by a metallic connecting member 98 shown as a band or strap bent around the two tubes and tightened to bind them one against the other.

To assemble the fusible cartridge with the other elements the projecting wire 80 of the cartridge is inserted first into the left-hand end of the tube 92, and when the shell has been inserted into the tube, as shown by Fig. 2, a water-tight closure may be effected by screwing a cap 100 on the receiving end of the tube. The wire 80 is preferably made of ductile metal such as brass to facilitate winding it around the shank of the anchoring screw 96, as shown in Fig. 3.

Having assembled the apparatus as above described, and having closed the switch and placed the locking member 68 in locking position, the user winds the wire 80 around the screw 96 and tightens the latter to maintain the locking member in the position shown by Fig. 3. The circuit-breaker is thus maintained in circuit-closing position for an indefinite period. Assuming that sufficient water 12 has been placed in the receptacle 10 to submerge both the heating unit 14 and the control tube 92, and that an electric current is connected to the coupling terminals 26 and 28, the heating unit will function to boil, or at least to heat, the water 12, as the case may be. If, through oversight or otherwise, the water becomes so far evaporated or drawn off as to uncover the highest reach of the heating unit 14 the temperature thereof will increase rapidly, and since the heat-conducting member 98 is located in proximity to the fusible element the temperature of the latter will also be increased rapidly until the critical temperature is reached. The melting temperature of solder is about 401 degrees Fahrenheit. As soon as the fusible element 82 becomes plastic, the wire 80 yields to the power of the springs 70 and the locking member 68 is thus moved to release the head 72 which then drops through the hole 78 and permits the spring 60 to repel the movable contact member 44 from the stationary contact members 24 and 30. Although the weight of the movable switch elements would be sufficient to open the circuit, the opening spring 60 effects a snap action to avoid arcing. The current is thus turned off while the greater portion of the heating unit is submerged but at a time when any considerable delay would permit it to become overheated and possibly burn itself out.

It is to be observed that while both the heating means and the fusible controlling element 82 of the illustrated device are arranged in the water space of the receptacle 10, the circuit-breaker or switch 44 is arranged outside the receptacle and is therefore, to all intents and purposes, thermally segregated from the source of heat. The various relationships of the heating means, the fusible element and the circuit-breaker are as follows: That of the heating means and the fusible element is thermal but not electrical; that of the heating means and the circuit-breaker is electrical but not thermal; while that of the circuit-breaker and the fusible element is mechanical but neither thermal nor electrical.

To restore the apparatus to operative condition it is only necessary to unscrew the cap 100 from the receiving end of the control tube 92, unscrew the anchoring screw 96 to release the wire 80, remove the old fuse cartridge, insert a new one, reset the circuit-breaker and replace the cap 100.

To guard against touching the circuit-breaker when the latter is connected to a source of current, the invention provides a cup-shaped shell 102 adapted to enclose the circuit-breaker, and also provides a coupling 104 permanently secured to the shell to form connection between the coupling terminals and a source of current. The coupling 104 may be of any well-known or preferred type adapted to be applied to a flexible cord 106 having conductors 108, 110. Couplings of the type illustrated are usually provided with internal resilient contact members adapted to engage and grip terminals 26 and 28 of the form shown. The open end of the shell 102 is adapted to fit around the closure 16, while the closed end is formed with a hollow boss or receptacle 105 to receive the coupling 104. The latter is fixed to the shell in a position such that it will register with the terminals 26 and 28 when the shell is in register with the closure 16. With this construction it is necessary to place the shell over the circuit-breaker incidentally to applying the coupling to the terminals 26 and 28, and the circuit-breaker cannot be uncovered without disconnecting it from the source of current.

To insure accurate register of the coupling member with the terminals when applying the coupling, the closure 16 and the shell are provided with cooperative mated portions that permit the shell to be applied in only one position. For this purpose the closure 16 is provided with a fin 112 and the shell is provided with a notch 114 adapted to receive the fin. The fin is preferably formed with a lateral extension 116 adapted to underlie and clear the bottom of the receptacle 10 as shown by Fig. 1. This lateral extension prevents applying the electrical assemblage to the receptacle 10 in any other position than the right-side-up position, since if the assemblage were turned or even inverted the extension would abut the receptacle and thus prevent seating the closure 16.

Having thus described my invention, what I claim as new and desire to secure by Letters Patent of the United States is:

1. In combination a receptacle for a substance to be heated, a heating device arranged to be submerged in such substance, means for conducting a current of heating medium to said device, means tending normally to interrupt the supply of such medium, and controlling means in thermally conductive relation to said heating device and arranged to maintain said interrupting means initially in non-interrupting position but to release the same in consequence of partial uncovering of said heating device.

2. In combination, a receptacle for a substance to be heated, a heating device arranged to heat such substance, means for conducting a current of heating medium to said device, means tending normally to interrupt the supply of such medium, and controlling means arranged to be submerged in the heated substance and arranged to maintain said interrupting means initially in non-interrupting position, but to release the same in consequence of being heated above a certain temperature.

3. In combination, a receptacle for a substance to be heated, a heating device, means for conducting a current of heating medium to said device, means tending normally to interrupt the supply of such medium, and controlling means arranged to maintain said interrupting means initially in non-interrupting position, said controlling means including a thermo-responsive element arranged in said receptacle and adapted to release said interrupting means when heated above a certain temperature.

4. In combination, a receptacle for a substance to be heated, a heating device, means for conducting a current of heating medium to said device, means tending normally to interrupt the supply of such medium, and controlling means including a fusible element arranged to maintain said interrupting means initially in non-interrupting position, said fusible element being arranged in said receptacle to be submerged in the heated substance and adapted to release said interrupting means when fusion occurs.

5. In combination, a receptacle, an electric circuit including heating means and an automatic mechanically operated circuit-breaker, said heating means being arranged in said receptacle, and thermally controlled means arranged in thermal communication with said heating means, said circuit-breaker being outside said receptacle and maintained initially in circuit-closing position by said thermally controlled means but being operative to break the circuit when an element of said thermally controlled means is heated to a certain temperature by said heating means.

6. In combination, a receptacle, an electric circuit including a heating unit and an automatic circuit-breaking switch, said heating unit being arranged in said receptacle, means arranged to restrain said switch initially in circuit-closing position, and means including a thermally responsive element arranged in said receptacle and in thermally conductive relation to said heating unit to effect the release of said switch by said restraining means when heated to a certain temperature.

7. In combination, a water-receptacle, an electric circuit including a heating unit and an automatic circuit-breaker, said heating unit being arranged in the water-space of said receptacle, and means arranged to maintain said circuit-breaker initially in circuit-closing position, said means including a fusible controlling element extraneous to said circuit but arranged in thermally conductive relation to said heating unit and being arranged to release said circuit-breaker when depletion or absence of water permits an uncovered portion of said heating unit to melt said fusible element.

8. In combination, a water-receptacle, an electric circuit including a heating unit and a self-opening switch, said heating unit being arranged in the water-space of said receptacle, and means arranged to maintain said switch initially in closed position, said means including a thermally controlled device arranged in said water space but at a higher level than said heating unit and in thermal communication with the latter to release said switch in consequence of depletion of the water.

9. In combination, a water-receptacle, an electric circuit including a heating unit and an automatic circuit-breaker, said heating unit being arranged in the water-space of said receptacle and said circuit-breaker being outside said receptacle, and means arranged to maintain said circuit-breaker initially in closed position, said means including a watertight metallic container arranged in said water-space and in thermally conductive relation to said heating unit, and a thermally controlled device enclosed in said container and adapted to release said circuit-breaker in consequence of depletion of the water below a certain level.

10. In combination, a water-receptacle, an electric circuit including a heating unit and a self-opening switch, said heating unit being arranged to heat the water in said receptacle, and means arranged to maintain said switch initially in circuit-closing position, said means including a thermally controlled device arranged in the water-space of said receptacle and adapted, when heated to a predetermined temperature, to release said switch.

11. A unitary structure comprising a hairpin tube, an electric circuit including a resistance element and a circuit-breaker tending normally to break the circuit, said resistance element being arranged in said tube, a control tube secured in thermally conductive relation to said hairpin tube, and means arranged to maintain said circuit-breaker initially in circuit-closing position, said means including a fusible element arranged in said control tube and adapted to release said circuit-breaker in consequence of an overheated condition of said control tube.

12. In combination, a water-receptacle having a hole below the highest water-level, a closure attached to the exterior of said receptacle to close said hole, a heating tube and a control tube both affixed to said closure and arranged to be inserted through said hole when the closure is applied to the receptacle, said control tube being in thermally conductive relation to said heating tube in the water-space of the receptacle, an electric circuit including a resistance heating element arranged in said heating tube, and thermo-responsive means including a controlling device arranged in said control tube for breaking said circuit automatically when said control tube is heated substantially above its maximum submersion temperature.

13. In combination, a water-receptacle, an electric circuit including a heating unit arranged in said receptacle, a control tube in thermally conductive relation to said heating unit, one end of said tube being in the water-space of said receptacle and having a detachable closure, the other end of said tube being outside said water-space, and thermo-responsive means arranged to control said circuit and including a circuit-breaker outside said tube, a fusible element arranged in said tube at said end that has said closure, and a member connecting said circuit-breaker and said fusible element to break said circuit when fusion occurs.

14. In combination, an electric circuit including a circuit-breaker tending normally to open the circuit, a tube fixed relatively to said circuit-breaker, a fusible cartridge arranged in one end of said tube, and a member extending through said tube and connecting said cartridge and said circuit-breaker to maintain the latter initially in circuit-closing position and to release the circuit-breaker when fusion of said cartridge occurs.

15. In combination, an electric circuit including a heating unit and an automatic circuit-breaker, a holder fixed to said unit in a thermally conductive relation thereto, a cartridge arranged in said holder and comprising a fusible element, and a non-fusible wire connecting said fusible element and said circuit-breaker to maintain the latter initially in circuit-closing position and to release the circuit-breaker when fusion of said element occurs.

16. In combination, an electric circuit including a heating unit and a circuit-breaker tending normaly to break the circuit, a tube affixed to said heating unit to be heated thereby, and a controlling device for maintaining said circuit-breaker initially in circuit-closing position, said device comprising a shell adapted to be inserted into one end of said tube and having an arresting flange, a fusible element cast in said shell, and a ductile wire one end of which is cast in said fusible element, said wire extending through said shell and said tube and being attached to said circuit-breaker.

17. In combination, a tubular fixture provided with an annular seat and a screw-thread, a shell formed to be inserted into said fixture and provided with an external flange to abut said seat, a screw-member formed to be screwed on to an end of said fixture and to secure said flange tightly against said seat, a fusible element secured in said shell, and a connecting member anchored in said fusible element and projecting through the other end of said fixture for connection with a device to be restrained by said fusible element.

18. In combination, an electrical device having coupling terminals, a flexible cord having a coupling adapted to be applied to said terminals to connect said device and a source of current, and a shell adapted to enclose said device and said terminals, said coupling being affixed to a wall of said shell so that applying it to said terminals requires applying said shell simultaneously to enclose said device.

19. In combination, a fixture, an electrical device secured thereto and having coupling terminals, a flexible cord having a coupling adapted to be applied to said terminals to connect said device and a source of current, and a shell adapted to enclose said device and said terminals and engage said fixture, said coupling being affixed to a wall of said shell so that applying it to said terminals requires applying said shell simultaneously to enclose said device, and said shell and fixture having mated portions to insure register of said coupling and said terminals.

20. In combination, a receptacle, an appliance comprising an attaching member and an electrical device affixed thereto, said device having coupling terminals, a detachable shell adapted to enclose said device and engage said attaching member, a coupling affixed to said shell to connect said terminals with a source of current, and means arranged to insure a predetermined position of said attaching member relatively to said receptacle and a predetermined position of said shell relatively to said attaching member whereby said coupling will be caused to register with said terminals.

21. In combination, a supporting fixture, an electrical device supported thereby, said device having coupling terminals, a shell adapted to enclose said device and embrace said fixture, and a coupling affixed to said shell to connect said terminals with a source of current when the shell is applied to said fixture.

22. In combination, a fixture provided with a seat, a fusible cartridge arranged on said seat, a device operatively connected to said cartridge to be controlled thereby, and a member by which said cartridge is secured to said seat, said fixture and said securing member having cooperative connecting portions by which rotation of said member will secure and release the cartridge.

In testimony whereof I have signed my name to this specification.

IRVING B. ANDREWS.

CERTIFICATE OF CORRECTION.

Patent No. 1,734,609.                                              Granted November 5, 1929, to

IRVING B. ANDREWS.

It is hereby certified that error appears in the printed specification of the above numbered patent requiring correction as follows: Page 1, line 42, after the word "device" insert arranged to be submerged in the substance in the receptacle , and lines 44 to 46, strike out the words "arranged to be submerged in the substance of the receptacle"; and that the said Letters Patent should be read with these corrections therein that the same may conform to the record of the case in the Patent Office.

Signed and sealed this 9th day of December, A. D. 1930.

M. J. Moore, (Seal)                                                            Acting Commissioner of Patents.